(12) United States Patent
Brown (10) Patent No.: US 12,372,071 B2
(45) Date of Patent: Jul. 29, 2025

(54) ACTUATOR ASSEMBLY

(71) Applicant: CAMBRIDGE MECHATRONICS LIMITED, Cambridge (GB)

(72) Inventor: Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/721,386

(22) PCT Filed: Dec. 22, 2022

(86) PCT No.: PCT/GB2022/053361
§ 371 (c)(1),
(2) Date: Jun. 18, 2024

(87) PCT Pub. No.: WO2023/118880
PCT Pub. Date: Jun. 29, 2023

(65) Prior Publication Data
US 2025/0059958 A1   Feb. 20, 2025

(30) Foreign Application Priority Data

Dec. 22, 2021 (GB) ...................................... 2118753
Dec. 22, 2022 (GB) ...................................... 2219524

(51) Int. Cl.
*F03G 7/06* (2006.01)
(52) U.S. Cl.
CPC ....... *F03G 7/06143* (2021.08); *F03G 7/0616* (2021.08)

(58) Field of Classification Search
CPC .......................... F03G 7/06143; F03G 7/0616
See application file for complete search history.

(56) References Cited

U.S. PATENT DOCUMENTS

| 4,543,090 A | 9/1985 | Mccoy |
| 4,932,210 A | 6/1990 | Julien et al. |
| 5,334,168 A * | 8/1994 | Hemmer ........... A61M 25/0158 604/95.05 |

(Continued)

FOREIGN PATENT DOCUMENTS

| EP | 1010440 A2 | 6/2000 |
| EP | 3629081 A2 | 4/2020 |

(Continued)

OTHER PUBLICATIONS

Combined Search and Examination report of GB Application No. 2118753.9 dated May 27, 2022.

(Continued)

*Primary Examiner* — Hoang M Nguyen
(74) *Attorney, Agent, or Firm* — Van Hoven PC; Stefan D. Osterbur; Joshua Van Hoven (57) ABSTRACT

An actuator assembly comprising a support structure; a movable part that is movable relative to the support structure in at least two degrees of freedom; an arrangement of superelastic SMA elements arranged, on actuation, to move the movable part in the at least two degrees of freedom relative to the support structure, wherein the hysteretic properties of the superelastic SMA elements are configured to hold the movable part in position when the superelastic SMA elements are not actuated.

18 Claims, 5 Drawing Sheets

(56) References Cited

U.S. PATENT DOCUMENTS

| | | | |
|---|---|---|---|
| 6,447,478 B1 | 9/2002 | Maynard | |
| 8,827,894 B2 * | 9/2014 | Belson | A61B 1/31 600/152 |
| 10,512,392 B2 * | 12/2019 | Gurusamy | A61B 1/008 |
| 2005/0006009 A1 | 1/2005 | Esashi et al. | |
| 2013/0002933 A1 | 1/2013 | Topliss et al. | |
| 2022/0136488 A1 * | 5/2022 | Kazi | F03G 7/06143 60/527 |
| 2022/0412325 A1 * | 12/2022 | Köpfer | F03G 7/065 |
| 2023/0124526 A1 | 4/2023 | Tsuruta et al. | |

FOREIGN PATENT DOCUMENTS

| | | |
|---|---|---|
| WO | 02/68820 A1 | 9/2002 |
| WO | 2020/120997 A1 | 6/2020 |
| WO | 2021/005351 A1 | 1/2021 |

OTHER PUBLICATIONS

Combined Search and Examination report of GB Application No. 2219524.2 dated Jun. 16, 2023.
Fu, Y., et al., "TiNi-based thin films in MEMS applications: a review", Sensors and Actuators A: Physical, vol. 112, No. 2-3, May 1, 2004, pp. 395-408.
International Search Report and Written Opinion received for PCT Patent Application No. PCT/GB22/053361, mailed on May 25, 2023, 15 pages.
Wikipedia, "Nickel titanium", Retrieved from the Internet: <https://en.wikipedia.org/w/index.php?title=Nickel_titanium&oldid=1060832896>, Dec. 17, 2021, pp. 1-14.

* cited by examiner

ACTUATOR ASSEMBLY

CROSS-REFERENCE TO RELATED APPLICATIONS

This application is a national stage application under 35 U.S.C. § 371 of International Application No. PCT/GB2022/053361, filed Dec. 22, 2022, which claims priority of GB Patent Application Nos. 2219524.2, filed Dec. 22, 2022, and 2118753.9, filed Dec. 22, 2021, the disclosures of each of which are hereby incorporated by reference herein in their entireties.

FIELD

The present application relates to an actuator assembly comprising superelastic SMA elements. The present invention also relates to an elongate instrument comprising a plurality of superelastic SMA elements.

BACKGROUND

Shape memory alloy (SMA) actuators are used in a variety of applications to effect motion of a movable part relative to a static part. For example, WO 2013/175197 A1 describes a camera with an SMA actuator assembly in which SMA wires are configured to, on contraction, move the movable part in directions perpendicular to an optical axis to provide optical image stabilization (OIS). This actuator assembly includes flexure arms that provide a lateral biasing force that biases a lens assembly towards a central position. Holding the lens assembly in a given position may require continuously energizing the SMA elements over a prolonged time. Such an arrangement not only consumes energy during the holding period, the stability of the lens carriage may also be susceptible to sudden movements and other external factors.

In general, it is desirable to provide SMA actuators that may hold a movable portion in place without requiring continuous power supply to the SMA elements.

SUMMARY

According to the present invention there is provided an actuator assembly comprising a support structure; a movable part that is movable relative to the support structure; an arrangement of superelastic SMA elements arranged, on actuation, to move the movable part relative to the support structure, wherein the hysteretic properties of the superelastic SMA elements are configured to hold the movable part in position when the superelastic SMA elements are not actuated (i.e. not powered or energized). The movable part may be held in position at any position within a continuous range of movement of the movable part relative to the support structure. This allows power consumption of the actuator assembly to be reduced, as well as reducing the risk of damage to the movable part compared to situations in which the movable part is free to move when the SMA elements are not actuated.

In some embodiments, the superelastic SMA elements have a phase transition temperature of less than 70° C., preferably less than 40° C., further preferably less than 20° C. A lower phase transition temperature allows the hysteretic properties of the superelastic SMA elements to take effect in a wider variety of applications.

In some embodiments, the movable part is movable (e.g. translationally or rotationally movable) relative to the support structure in at least two degrees of freedom, and the superelastic SMA elements may, upon actuation, move the movable part in the at least two degrees of freedom relative to the support structure. Using the hysteretic properties to hold the position of the movable part in position may be particularly beneficial when at least two DOF movement is enabled, because other holding mechanisms (such as a ratchet clamp, etc) may be more difficult to implement.

In some embodiments, the movable part is movable relative to the support structure in at least three degrees of freedom, and the superelastic SMA elements may, upon actuation, move the movable part in the at least three degrees of freedom relative to the support structure (e.g. translationally move the movable part along three orthogonal axes). Using the hysteretic properties to hold the position of the movable part in position may be particularly beneficial when two DOF movement is enabled, because other holding mechanisms (such as a ratchet clamp, friction clamp, etc) may be more difficult, if not impossible, to implement.

In some embodiments, the movable part is suspended from the support structure by the superelastic SMA elements. Using the hysteretic properties to hold the position of the movable part in position may be particularly beneficial when two DOF movement is enabled, because other holding mechanisms (such as a ratchet clamp, friction clamp, etc) may be more difficult to implement due to the lack of a bearing arrangement guiding movement of the movable part. The actuator assembly need not comprise a bearing arrangement constraining movement of the movable part relative to the support structure in any degrees of freedom.

In some embodiments, the movable part is movable, e.g. translationally movable, relative to the support structure along three orthogonal axes. In some embodiments, the movable part is rotatable relative to the support structure about at least two orthogonal axes.

In some embodiments, the arrangement of superelastic SMA elements comprises eight superelastic SMA elements inclined with respect to a notional primary axis with two superelastic SMA elements on each of four sides around the primary axis, the superelastic SMA elements being connected between the movable part and the support structure so that on contraction two groups of four superelastic SMA elements provide a force on the movable part with a component in opposite directions along the primary axis, the superelastic SMA elements of each group being arranged with 2-fold rotational symmetry about the primary axis. Such an arrangement of SMA elements may allow movement of the movable part in up to 6 DOFs, e.g. translational movement along three orthogonal axes and/or rotation about two or three orthogonal axes.

In some embodiments, the arrangement of superelastic SMA elements comprises four superelastic SMA elements capable of being selectively driven to move the movable part relative to the support structure to any position within a range of movement in a movement plane without applying any net torque to the movable part in the movement plane. Such an arrangement of SMA elements may allow movement of the movable part in up to 3 DOFs, e.g. movement along two orthogonal axes and optionally rotation about an axis that is perpendicular to the two orthogonal axes.

In some embodiments, the actuator assembly may further comprise a lens assembly and/or image sensor coupled to the movable part and/or support structure. In some embodiments, the actuator assembly may comprise an optical component or imaging component fixed relative to the support structure and/or movable part. It may be particularly beneficial to allow holding the movable part in position in such a device, because the risk of damage to the optical or imaging component (such as lens assembly and/or image sensor) may be reduced when the SMA elements are not actuated.

According to another aspect of the invention, there is provided an actuator assembly comprising a support structure; a movable part that is movable relative to the support structure; one or more SMA actuator elements arranged, on actuation, to move the movable part in relative to the support structure, and one or more superelastic SMA elements arranged such that the hysteretic properties of the superelastic SMA elements are configured to hold the movable part in position when the SMA actuator elements are not actuated. The SMA actuator elements may be distinct and/or separate to the superelastic SMA wires.

According to another aspect of the present invention, there is provided an elongate instrument comprising a proximal end and a distal end; a plurality of superelastic SMA elements arranged around an axis between the proximal and distal ends, wherein the superelastic SMA elements are arranged, on selective energization, to bend the distal end relative to the proximal end, and wherein the hysteretic properties of the superelastic SMA elements constrain the distal end from returning to an unbent position when the plurality of superelastic SMA elements are not energized. The hysteretic properties of the superelastic SMA elements may hold the distal end in position when the superelastic SMA elements are not actuated (i.e. energized or powered).

Selective energization of the superelastic SMA elements may thus effect movement of the distal end relative to proximal end. The distal end may thus be considered to correspond to a movable part, and the proximal end may be considered to correspond to a support structure. Upon ceasing energization, the hysteretic properties of the superelastic SMA elements constrain the distal end from moving back to its previous position. As such, the distal end may be moved and subsequently retained in position without continuous energization of the superelastic SMA elements, reducing power consumption compared to a situation in which SMA elements need to be provided with continuous energization to hold the distal end in place. The distal end may be held in position at any position within a continuous range of bending.

In some embodiments, the plurality of superelastic elements are arranged to be in tension or in compression, and are strained in an unbent position of the distal end. In some embodiments, at the unbent position of the distal end the plurality of superelastic SMA elements are strained equally.

In some embodiments, the plurality of superelastic SMA elements comprises two superelastic SMA elements, wherein the two superelastic SMA elements are configured, on selective energization, to bend the distal end in opposite directions.

In some embodiments, the plurality of superelastic SMA elements comprises three or more superelastic SMA elements, wherein the superelastic SMA elements are configured, on selective energization, to bend the elongate instrument in any direction.

In some embodiments, the plurality of superelastic SMA elements comprises two pairs of superelastic SMA elements, wherein the superelastic SMA elements within each pair are configured, on selective energization, to bend the elongate instrument in opposite directions and wherein the pair of superelastic SMA elements are configured, on selective energization, to bend the elongate instrument in perpendicular directions.

In some embodiments, the plurality of superelastic SMA elements are evenly distributed around the axis.

In some embodiments, the elongate instrument further comprises a flexible core extending along the axis, wherein the plurality of superelastic SMA elements are coupled to the flexible core.

In some embodiments, the flexible core comprises one or more electrical conductors connected at the distal end to the plurality of superelastic SMA elements.

In some embodiments, the flexible core comprises superelastic SMA.

In some embodiments, in the unbent position the flexible core is in compression and the plurality of superelastic SMA elements are in tension, or wherein the flexible core is in tension and the plurality of superelastic SMA elements are in compression.

In some embodiments, the elongate instrument further comprises insulator elements that coextend with the plurality of superelastic SMA elements and are provided between adjacent superelastic SMA elements.

In some embodiments, the plurality of superelastic SMA elements comprises a first set of superelastic SMA elements that are arranged to be in tension and strained in an unbent position of the distal end and a second set of superelastic SMA elements that are arranged to be in compression and strained in an unbent position of the distal end.

In some embodiments, the superelastic SMA elements of the second set are arranged diametrically opposite the axis to the superelastic SMA elements of the first set.

In some embodiments, the superelastic SMA elements of the first set are comprises three or more superelastic SMA elements that are configured, on selective energization, to bend the elongate instrument in any direction.

BRIEF DESCRIPTION OF THE DRAWINGS

Certain embodiments of the present invention will now be described, by way of example only, with reference to the accompanying drawings in which.

DETAILED DESCRIPTION

The present invention provides various means for retaining a movable part at a desired position when SMA elements are not energised, thereby eliminating the need for continuously energising the SMA elements as required by known techniques. The present invention relies on hysteresis of superelastic SMA elements to retain the movable part at the desired position.

Actuator Assembly

Figure 1:
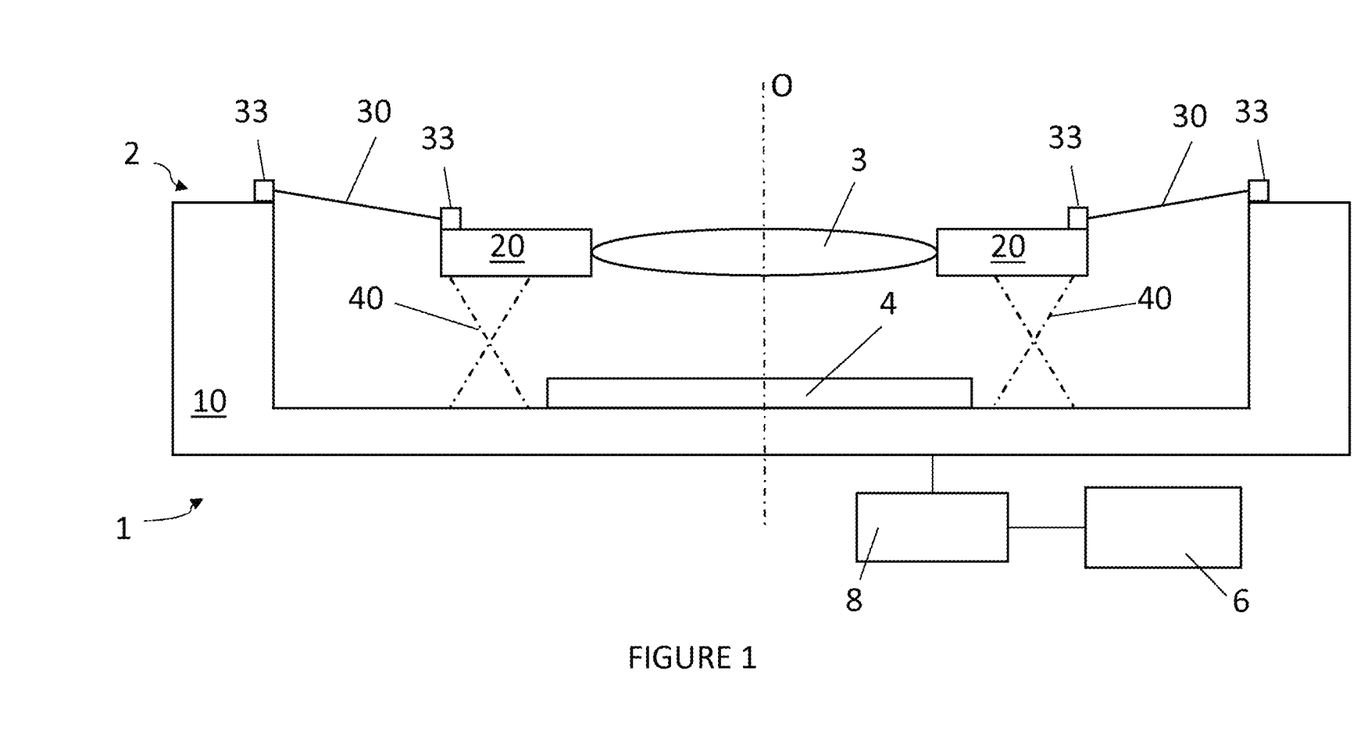
FIG. 1 is a schematic cross-section of an actuator assembly according to embodiments of the present invention.

FIG. 1 schematically shows an actuator assembly 2 in accordance with an embodiment of the present invention.

The apparatus comprises an actuator assembly 2. The actuator assembly 2 comprises a support structure 10 and a movable part 20. The movable part 20 is supported on the support structure 10. The movable part 20 is movable relative to the support structure 10. For example, the movable part 20 may be movable relative to the support structure 10 in any one of, or any combination of, six degrees of freedom (DOF) of movement:

Tz movement—the movable part 20 may be translationally movable relative to the support structure 10 along the primary axis P, i.e. in 1 DOF along the primary axis P. The movable part 20 may be movable to any position within a range of movement along the primary axis P.

Tx and Ty movement—the movable part 20 may be translationally movable relative to the support structure 10 in a plane that is orthogonal to the primary axis, i.e. in 2 DOFs (along two orthogonal axes) in the plane. The movable part 20 may be movable to any position within a range of movement in the plane.

Rz movement—the movable part 20 may be rotatable relative to the support structure 10 about the primary axis P, i.e. in 1 DOFs in the plane.

Rx and Ry movement—the movable part 20 may be rotatable relative to the support structure 10 about two axes that are orthogonal to the primary axis P, i.e. in 2 DOF. Put another way, the movable part 20 may be tilted about two tilt axes that are orthogonal to the primary axis P.

In particular embodiments of the invention, the movable part 20 is movable relative to the support structure 10 in at least two DOFs. For example, Tx and Ty movement of the movable part 20 relative to the support structure 10 may be enabled, and optionally additionally Rz movement of the movable part 20 relative to the support structure 10 may be enabled. Alternatively or additionally, Rx and Ry movement of the movable part 20 relative to the support structure 10 may be enabled. In some other embodiments, only a single DOF of movement, such as only Rz movement of the movable part 20 relative to the support structure 10 may be enabled.

The actuator assembly 2 of FIG. 1 comprises one or more SMA elements 30. The SMA elements 30 may also be referred to as SMA wires 30. The SMA elements 30 are connected between the support structure and the movable part 20. For example, the SMA elements 30 are connected at their ends to the support structure 10 and/or to the movable part 20 using connection elements 33, for example crimp connections. The crimp connections may crimp the SMA elements 30 to hold the SMA elements 30 mechanically, as well as providing electrical connections to the SMA elements 30. However, any other suitable connections may alternatively be used. In general, there may be components intermediate between the SMA element 30 ends and the support structure 10 and/or movable part 20, which intermediate components may transfer an actuation force of the SMA elements 30 to the movable part 20. In general the SMA elements 30 are capable, on selective actuation thereof, of driving movement of the movable part 20 with respect to the support structure 10 in the one or more DOFs of movement.

In some embodiments, the movable part 20 is supported (so suspended) on the support structure 10 exclusively by the SMA elements 30. However, optionally the actuator assembly 2 comprises a bearing arrangement 40 that supports the movable part on the support structure 10. The bearing arrangement 40 may have any suitable form for allowing movement of the movable part 20 with respect to the support structure 10. The bearing arrangement 40 may constrain movement of the movable part 20 relative to the support structure 10 to any one of, or any combination of, the six DOFs of movement. For this purpose, the bearing arrangement 40 may, for example, comprise a rolling bearing (such as a ball bearing or roller bearing), a flexure bearing (i.e. an arrangement of flexures guiding movement) or a plain bearing (i.e. a sliding bearing). The bearing arrangement 40 may prevent movement in other DOFs.

The actuator assembly 2 may further comprise a controller 8. The controller 8 may be implemented in an integrated circuit (IC) chip. The controller 8 generates control signals for controlling actuation of the SMA elements 30. The control signals may be pulse width modulated (PWM) control signals, for example. SMA material has the property that on heating it undergoes a solid-state phase change that causes the SMA material to contract. Thus, applying control signals to the SMA elements 30, thereby heating the SMA elements 30 by allowing an electric current to flow, will cause the SMA elements 30 to actuate (e.g. to contract when in the form of SMA wires 30) and move the movable part 20. The control signals are chosen to drive movement of the movable part 20 in a desired manner, for example to effect movement in the desired combination of DOFs.

Superelastic SMA Elements

In conventional SMA actuator assemblies, the movable part is not constrained from moving in the DOF's allowed by the bearing arrangement when the SMA wires are not energized. So, the movable part is not held in position when the SMA wires are not energized. This may lead to damage to the movable part (and any components carried by the movable part, such as lenses) when adverse loading conditions, such as impact events, affect the actuator assembly. Furthermore, SMA wires may need to be continuously powered to maintain a position of the movable part within the range of movement of the movable part, even when the movable part is not moving.

The present invention aims to solve this problem by relying on the hysteresis of superelastic SMA elements to retain the movable part at the desired position. So, according to the present invention, the actuator assembly comprises superelastic SMA elements. The hysteretic properties of the superelastic SMA elements are configured to hold the movable part in position when the superelastic SMA elements are not actuated, i.e. when the superelastic SMA elements are unpowered or unenergized.

Figure 5:
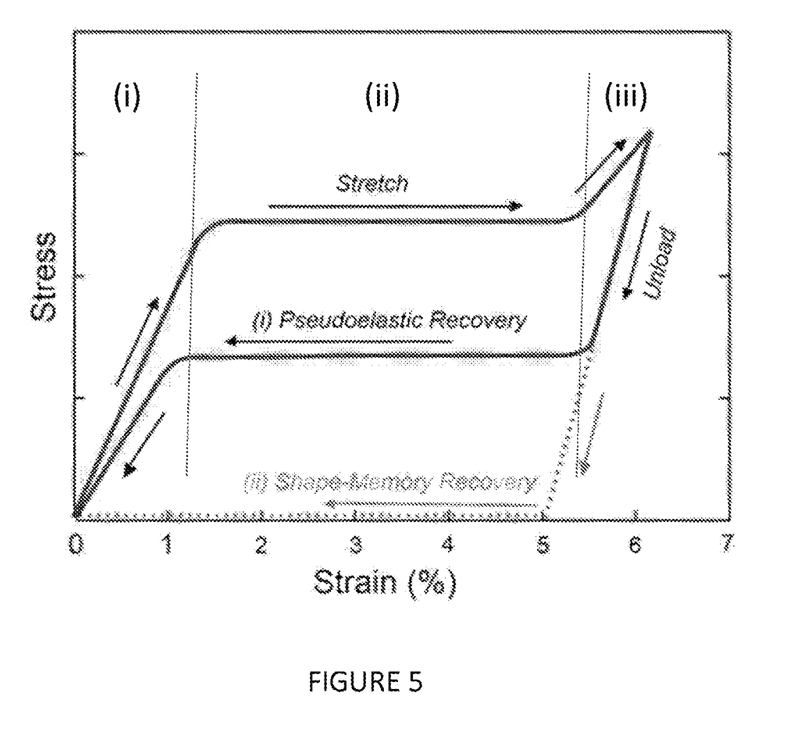
FIG. 5 is a graph showing the stress-strain relation of SMA material.

In particular, the material composition and pre-treatment of the superelastic SMA element is chosen such that the superelastic SMA elements, when unenergized and in the normal operating environment, exhibit pseudo-elastic properties in which the superelastic SMA elements are in a state between a full austinite phase and a full martensite phase. With reference to FIG. 5, for example, the superelastic SMA elements may remain in the pseudo-elastic range (ii) between the full Martensite (i) and the full Austenite (iii) phase even when unpowered. In contrast, SMA wires used in conventional actuator assemblies may revert to the full Martensite phase (i) when unpowered. The superelastic SMA elements thus have a phase transition (from the full Martensite to the full Austenite phase) within a temperature range that is below the average operating temperature at which the superelastic SMA elements normally operate. The average operating temperature of the superelastic SMA elements may be the ambient temperature of an environment within which the superelastic SMA operate (e.g. the body temperature of about 37° C. of a human for operation within the human body, or an elevated temperature due to heating effects of nearby electronic components), or may be greater than the ambient temperature due to heating effects of operating the superelastic SMA elements themselves.

The superelastic SMA elements may have a phase transition temperature of below 70° C., preferably below 50° C. In general, the phase transition temperature is a temperature at which the SMA material, upon heating from a cooled state, undergoes phase transition from the full Martensite phase (i) to the full Austenite phase (ii). So, a phase transition temperature may be understood to be a temperature in which the SMA material operates in the pseudo-elastic range. The phase transition temperature may correspond to the temperature at which the SMA material, upon heating from a cooled state, reaches the full Austenite phase (iii), i.e. the temperature at which the SMA material stops the phase transition from Martensite to Austenite phase (i.e. the upper temperature limit of the pseudo-elastic range). In some embodiments, the phase transition temperature may correspond to the temperature at which the SMA material, upon heating from a cooled state, starts transitioning from the full Martensite phase (i) to the partial Austenite phase (ii) (i.e. the lower temperature limit of the pseudo-elastic range).

In contrast, non-superelastic SMA wires used in conventional actuator assemblies are deliberately chosen to have higher phase transition temperatures above 70° C. Conventionally, such higher phase transition temperatures were chosen to reduce the impact of ambient temperature fluctuations on the actuation control of the actuator assembly. The inventors of the present invention, however, have realized the benefits of operating with superelastic SMA elements (in particular of making use of hysteretic characteristics to maintain the position of the movable part), overcoming technical prejudice to incorporate superelastic SMA wires with relatively lower phase transition temperatures in miniature actuator assemblies.

According to embodiments of the present invention, the phase transition temperature at which the SMA material, upon heating from a cooled state, starts transitioning from the full Martensite phase (i) to the partial Austenite phase (ii) (i.e. the lower temperature limit of the pseudo-elastic range) may be less than 70° C., preferably less than 50° C. In some preferred embodiments, this phase transition temperature is less than 35° C., optionally less than 25° C. or even less than 15° C. or 0° C. Phase transition temperatures below 35° C. may allow making use of the benefits of the superelastic SMA elements in environments having elevated temperatures, such as use in the human body or near heat-generating electronic components. Phase transition temperatures below 25° C. may extend the use of the benefits of the superelastic SMA elements to environments having lower elevated temperatures, such as in handheld devices near electric circuitry or components. Phase transition temperatures below 15° C. may extend the use of the benefits of the superelastic SMA elements to most ambient temperatures. Phase transition temperatures below 0° C. may extend the use of the benefits of the superelastic SMA elements to almost all ambient temperatures.

In general, the phase transition temperature at which the SMA material, upon heating from a cooled state, starts transitioning from the full Martensite phase (i) to the partial Austenite phase (ii) (i.e. the lower temperature limit of the pseudo-elastic range) may be less than 50° C., less than 45° C., less than 40° C., less than 38° C., less than 35° C., less than 30° C., less than 25° C., less than 23° C., less than 20° C., less than 15° C., less than 10° C., less than 5° C. or less than 0° C.

The phase transition temperature of SMA material may be tailored by a large number of known techniques. For example and without limitation, the chemical composition and pre-treatment (e.g. heat treatment) of SMA material affects the phase transition temperature. One commonly used SMA material is Nitinol, the phase transition temperatures of which may be tailored within a range from about −100° C. to 120° C. by suitable metallurgy. Addition of impurities (elements other than nickel and titanium) can further extend that range.

Any of the SMA wires in the arrangements described herein may be provided as superelastic SMA wires. For example, the SMA wires in the arrangements described with reference to FIG. 2 or 3 may be provided as superelastic SMA wires. In general, the present invention extends to incorporating superelastic SMA elements either to replace SMA actuator elements (which herein are considered to be formed from SMA material having a phase transition temperature at which the SMA material, upon heating from a cooled state, starts transitioning from the full Martensite phase (i) to the partial Austenite phase (ii) (i.e. the lower temperature limit of the pseudo-elastic range) of 70° C. or more) or in addition to SMA actuator elements.

The superelastic SMA elements 30 may be arranged to be in tension at the operating temperature of the actuator assembly. The superelastic SMA elements may be stretched to a strain that places them halfway across the pseudo-elastic region or more than halfway across the pseudo-elastic region depicted in FIG. 5. Alternatively, the superelastic SMA elements 30 may be arranged to be in compression at the operating temperature of the actuator assembly. The superelastic SMA elements may be compressed to a strain that places them halfway across the pseudo-elastic region or more than halfway across the pseudo-elastic region. The superelastic SMA elements 30 may be arranged to be in tension or in compression at a temperature of less than 50° C., less than 45° C., less than 40° C., less than 38° C., less than 35° C., less than 30° C., less than 25° C., less than 23° C., less than 20° C., less than 15° C., less than 10° C., less than 5° C. or less than 0° C.

There is thus provided an actuator assembly 2 comprising a support structure 10; a movable part 20 that is movable relative to the support structure 10; an arrangement of superelastic SMA elements 30 arranged, on actuation, to move the movable part 20 relative to the support structure 10, wherein the hysteretic properties of the superelastic SMA elements 30 are configured to hold the movable part in position when the superelastic SMA elements 30 are not actuated. The movable part may be movable relative to the support structure 10 in at least two degrees of freedom, and the superelastic SMA elements may, upon actuation, move the movable part 20 in the at least two degrees of freedom relative to the support structure 10.

Arrangement of SMA Elements for Planar Movement

In some embodiments of the invention, the movable part 20 is movable relative to the support structure 10 in a plane that is orthogonal to the primary axis P, i.e. in two orthogonal directions in the plane. The movable part 20 may additionally be rotatable relative to the support structure 10 about the primary axis P. So, Tx movement, Ty movement and optionally Rz movement may be enabled. The SMA elements 30 may, on selective actuation, effect such movement of the movable part 20.

Figure 2:
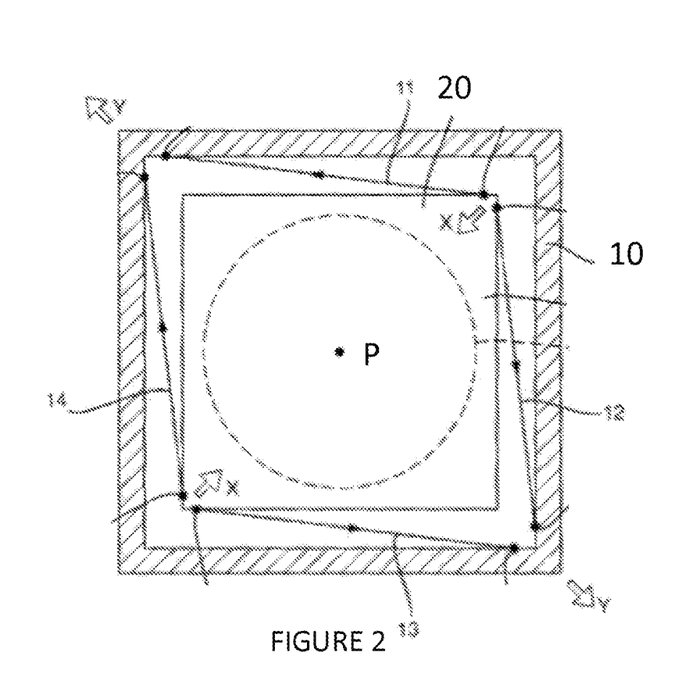
FIG. 2 is a schematic plan view of a particular SMA wire arrangement according to embodiments of the present invention.

The SMA elements 30 may be in the arrangement of SMA wires described in WO2013/175197 A1 or WO2017/072525 A1, each of which is herein incorporated by reference. FIG. 2 schematically depicts such an arrangement of SMA wires 30, in plan view (i.e. viewed along the primary axis P), labelled here as SMA wires 11 to 14.

The SMA wires 11 to 14 have an arrangement around the primary axis P as follows.

Each of the SMA wires 11 to 14 is arranged along one side of the movable part 20. Thus, the SMA wires 11 to 14 are arranged in a loop at different angular positions around the primary axis P. Thus, the four SMA wires 11 to 14 consist of a first pair of SMA wires 11 and 13 arranged on opposite sides of the primary axis P and a second pair of SMA wires 12 and 14 arranged on opposite sides of the primary axis P. The first pair of SMA wires 11 and 13 are capable on selective driving to move the movable part 20 relative to the support structure 10 along a first axis in a plane, and the second pair of SMA wires 12 and 14 are capable on selective driving to move the movable part 20 relative to the support structure 10 along a second axis in said plane transverse to the first axis. Movement in directions other than parallel to the SMA wires 11 to 14 may be driven by a combination of actuation of these pairs of the SMA wires 11 to 14 to provide a linear combination of movement in the transverse directions. Another way to view this movement is that simultaneous contraction of any pair of the SMA wires 11 to 14 that are adjacent each other in the loop will drive movement of the movable part 20 in a direction bisecting those two of the SMA wires 11 to 14 (diagonally in FIG. 2, as labelled by the arrows X and Y).

As a result, the SMA wires 11 to 14 are capable of being selectively driven to move the movable part 20 relative to the support structure 10 to any position in a range of movement in two orthogonal directions perpendicular to the primary axis P. The magnitude of the range of movement depends on the geometry and the range of contraction of the SMA wires 11 to 14 within their normal operating parameters.

Since none of the SMA wires are collinear, they can be arranged to apply cancelling torques when operated together. Successive SMA wires 11 to 14 around the primary axis P are connected to apply a force to the movable part 20 in alternate senses around the primary axis P. That is, as viewed outwardly of the primary axis P, the SMA wire 11 is connected at its left end to the support structure 10 and its right end to the movable part 20, but the next SMA wire 12 is connected at its left end to the movable part 20 and its right end to the support structure 10, and so on. As a result, successive SMA wires 11 to 14 around the primary axis P also apply a torque in alternate senses around the primary axis P. That is, when viewed as shown in FIG. 2, the SMA wire 11 applies a force to the movable part 10 in an anticlockwise sense, but the next SMA wire 12 applies a force to the movable part 10 that in a clockwise sense, and so on.

This means that the first pair of SMA wires 11 and 13 generate a net torque to the movable part 20 in said plane around the primary axis P in a first sense (anti-clockwise in FIG. 2), and the second pair of SMA wires 12 and 14 generate a net torque to the movable part 20 in said plane around the primary axis P that is in an opposite sense (clockwise in FIG. 2). As a result, rotation about the primary axis P of the movable part 20 may be controlled. So, Rz movement of the movable part 20 may be enabled, or selectively suppressed by appropriate driving of the SMA wires.

So, the actuator assembly 1 may comprise a total of four SMA wires 30. The four SMA wires 30 may be connected between the movable part 20 and the support structure 10 in an arrangement wherein none of the SMA wires 30 are collinear. The SMA wires 30 are capable of being selectively driven to move the movable part 20 relative to the support structure 10 to any position in a range of movement within the plane, without applying any net torque around the primary axis P to the movable part 20. Two of the SMA wires 30 may be connected between the movable part 20 and the support structure 10 to each apply a torque to the movable part in a first sense around the primary axis P, and the other two SMA wires 30 may be connected between the movable part 20 and the support structure 10 to each apply a torque to the movable part 20 in a second, opposite sense around the primary axis P.

The four SMA wires 30 may be arranged in a loop at different angular positions around the primary axis P, successive SMA wires 30 around the primary axis P being connected to apply a force to the movable part 20 in alternate senses around the primary axis P.

The four SMA wires 30 may consist of two pairs of SMA wires 30. The first pair of SMA wires 30 is arranged to be capable of being selectively driven to drive the movable part relative to the support structure along a first axis (e.g. an x axis) in said plane, and to apply a net torque to the movable part around the primary axis P. The second pair of SMA wires 30 is arranged to be capable of being selectively driven to drive the movable part 20 relative to the support structure 10 along a second axis (e.g. a y axis) transverse to the first axis, and to apply a net torque to the movable part that is in an opposite sense to that applied by the first pair of SMA wires 30. Within each pair of SMA wires 30, the two SMA wires 30 may be arranged on opposite sides of the primary axis P. Each of the SMA wires 30 may extend perpendicularly to the primary axis P, so the SMA wires 30 may extend in a common plane. Alternatively, the SMA wires 30 could be offset from each other along the primary axis P and still obtain the benefits described above, if they meet the more general requirement that projections of the four SMA wires 11 to 14 onto a notional plane perpendicular to the primary axis P have the arrangement shown in FIG. 2 when viewed in that direction.

Arrangement of SMA Elements for 3D Movement

In some embodiments of the invention, the movable part 20 is movable relative to the support structure 10 along three orthogonal axes. So, Tx movement, Ty movement and Tz movement may be enabled. Alternatively or additionally, Rx movement, Ry movement and Rz movement may be enabled. The SMA elements 30 may, on selective actuation, effect such movement of the movable part 20.

Figure 3:
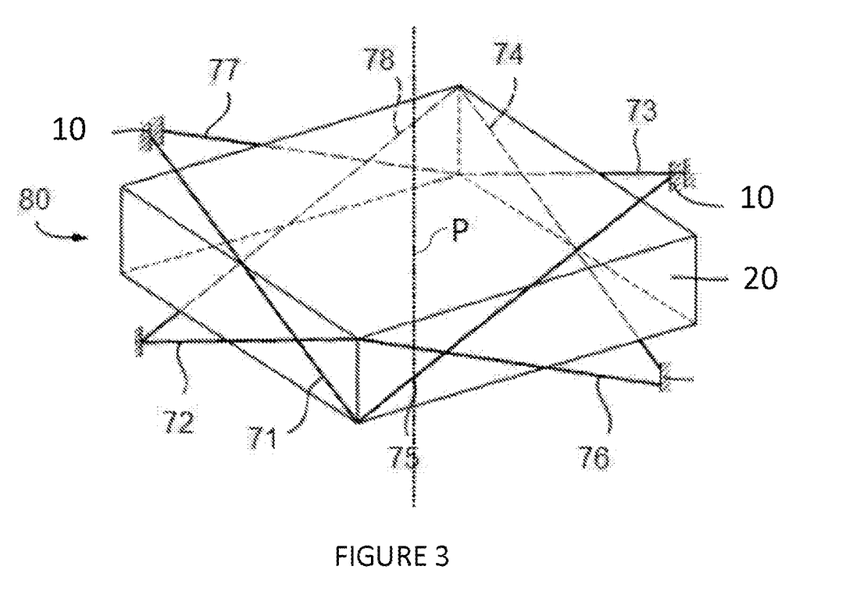
FIG. 3 is a schematic perspective view of a particular SMA wire arrangement according to embodiments of the present invention.

The SMA elements 30 may be in the arrangement of SMA wires described in WO 2011/104518 A1, which is herein incorporated by reference. FIG. 3 is a schematic diagram of such an arrangement 80 comprising eight SMA wires 71-78, in perspective view.

The arrangement 80 shown in FIG. 3 includes SMA wires 71-78 arranged on each of four perpendicular sides of the primary axis P and connected to the movable part 20 and the support structure 10. Thus, one of the SMA wires 71-78 on each side provides a force on the movable part 20 in the same direction along the primary axis P. In particular, the SMA wires 71, 73, 75, 77 form a group that provide a force in one direction (upwards in FIG. 3) and the other SMA wires 72, 74, 76, 78 form a group that provide a force in the opposite direction (downwards in FIG. 3).

The SMA wires 71-78 have a symmetrical arrangement in which lengths and inclination angles are the same, so that both the group of SMA wires 71, 73, 75, 77 and the group of SMA wires 72, 74, 76, 78 are each arranged with two-fold rotational symmetry about the primary axis P (i.e. bisecting the angle between SMA wires 71-78 on adjacent sides and across the diagonals of the square shape of the movable part 20). As a result of this symmetrical arrangement, different combinations of the SMA wires 71-78, when selectively actuated are capable of driving movement of the movable part 20 with multiple degrees of freedom.

The group of SMA wires 71, 73, 75, 77 and the group of SMA wires 72, 74, 76, 78 when commonly actuated drive movement along the primary axis P. So, Tz movement is enabled.

Within each group, adjacent pairs of the SMA wires (for example on one hand SMA wires 71, 77 and on the other hand SMA wires 73, 75) when differentially actuated drive tilting about a lateral axis perpendicular to the primary axis P. Tilting in any arbitrary direction may be achieved as a linear combination of tilts about the two lateral axes. So, Rx and Ry movement is enabled.

Sets of four SMA wires, including two SMA wires from each group, (for example on one hand SMA wires 71, 72, 77, 78 and on the other hand SMA wires 73-76) when commonly actuated drive movement along a lateral axis perpendicular to the primary axis P. Movement in any arbitrary direction perpendicular to the primary axis P may be achieved as a linear combination of movements along the two lateral axes. So, Tx and Ty movement is enabled.

Sets of four SMA wires, (for example SMA wires on opposite sides of the movable part 20, such as on one hand SMA wires 71-74 and on the other hand SMA wires 75-78) when commonly actuated drive rotation about the primary axis P. So, Rz movement is enabled.

Hence the arrangement shown in FIG. 3 can thus perform tilting movement or translational movement. The arrangement of SMA elements 30 can achieve movement of the movable part 20 relative to the support structure 10 in all six DOFs of movement, or in any combination of the six DOFs of movement.

In particular, the actuator assembly 1 may comprise eight SMA wires 30 inclined with respect to the primary axis P with two SMA wires 30 on each of four sides around the primary axis P. The SMA wires 30 are arranged so that, on contraction, two groups of four SMA wires 30 provide a force on the movable part with a component in opposite directions along the primary axis. The SMA wires 30 of each group are arranged with 2-fold rotational symmetry about the primary axis P. Each group of four SMA wires 30 comprises one SMA wire 30 on each side of the movable part 20, when viewed along the primary axis P. On each side, the two SMA wires 30 are parallel to one another or are inclined in opposite senses with respect to each other and cross. The two SMA wires 30 that are on each side may be each perpendicular to the same notional lateral axis that is perpendicular to the primary axis P.

The movable part 20 may be supported on the support structure 10 solely by the eight SMA wires 30.

Other Arrangements of SMA Elements

The present invention is not limited to the arrangement of SMA wires of FIG. 2 or 3, but more generally extends to actuator assemblies in which a superelastic SMA element is incorporated. Such actuator assemblies are further disclosed, for example, in WO2007/113478 A1 or WO2019/243849 A1, describing use of the actuator assemblies for 1 DOF movement in a camera apparatus to effect autofocus or zoom functionality.

In other embodiments of the apparatus 1, AF is performed. In such embodiments, the apparatus 1 may comprise the camera lens actuation apparatus of WO2007/113478 A1 or the SMA actuation apparatus of WO 2019/243849, each of which is herein incorporated by reference.

Arrangement of Superelastic SMA Elements Alongside SMA Actuator Elements

The superelastic SMA elements may be provided in place of the SMA elements described in the arrangements above. Alternatively, superelastic SMA elements may be provided alongside SMA actuator elements in the arrangement of SMA elements described above.

So, the actuator assembly 2 may comprise one or more SMA actuator elements 30 arranged, on actuation, to move the movable part 20 relative to the support structure 10. The SMA actuator elements 30 may have a phase transition temperature above 70° C., for example. The actuator assembly 2 may additionally comprise one or more superelastic SMA elements. The superelastic SMA elements may be separate and distinct from the SMA actuator elements 30. The hysteretic properties of the superelastic SMA elements are configured to hold the movable part 20 in position when the SMA actuator elements are not actuated.

The SMA actuator elements 30 may be in any of the arrangements of SMA elements 30 described herein, for example in the arrangement described with reference to FIG. 2 or the arrangement described with reference to FIG. 3. The superelastic SMA elements may be in the same or in a different arrangement as the SMA actuator elements 30. For example, the superelastic SMA elements may be formed as superelastic SMA wires that run mechanically in parallel with the SMA actuator wires. The superelastic SMA elements may be electrically grounded on both ends, or electrically insulated at both ends. A control signal need not be provided to the superelastic SMA wires, and so no separate electrical connection to the superelastic SMA elements is required.

Camera Apparatus

The actuator assembly 2 according to embodiments described herein may be incorporated into a camera apparatus 1. The apparatus 1 may be incorporated in a portable electronic device such as a mobile telephone, or tablet computer. Thus, miniaturisation is an important design criterion.

With reference to FIG. 1, the camera apparatus 1 comprises the actuator assembly 2. The camera apparatus 1 further comprises a lens assembly 3 and an image sensor 4. The lens assembly 3 comprises one or more lenses configured to focus an image on the image sensor 4. The optical axis O of the lens assembly 3 may coincide with the primary axis P of the actuator assembly 2. The image sensor 4 captures an image and may be of any suitable type, for example a charge coupled device (CCD) or a CMOS device. The lens assembly 3 comprises a lens carrier, for example in the form of a cylindrical body, supporting the one or more lenses. The one or more lenses may be fixed in the lens carrier, or may be supported in the lens carrier in a manner in which at least one lens is movable along the optical axis O, for example to provide zoom or focus, such as auto-focus (AF). The camera apparatus 1 may be a miniature camera apparatus in which the or each lens of the lens assembly 3 has a diameter of 20 mm or less, preferably of 12 mm or less.

In the embodiment shown in FIG. 1, the movable part 20 comprises the lens assembly 3. The image sensor 4 may be fixed relative to the support structure 10, i.e. mounted on the support structure 10. In other embodiments (not shown), the lens assembly 3 may be fixed relative to the support structure 10 and the movable part 20 may comprise the image sensor 4. In either embodiment, in operation the lens assembly 3 is moved relative to the image sensor 4. This has the effect that the image on the image sensor 4 is moved and/or changed in focus. So, optical image stabilization (OIS) or autofocus (AF) or other focus or zoom functionality may be implemented in the camera apparatus 1.

Optionally, the camera apparatus 1 comprises a vibration sensor 6. The vibration sensor 6 may be a gyroscope sensor, for example, although in general other types of vibration sensor 6 could be used. The vibration sensor 6 detects vibrations that the camera apparatus 1 is experiencing and generates output signals representative of the vibration of the camera apparatus 1. The controller 8 receives the output signals, and generates the drive signals for the SMA elements 30 in response to the output signals, for example so as to counteract the vibrations represented by the output signals. The controller 8 may thus control the SMA elements 30 to achieve OIS.

Making use of the hysteretic properties of superelastic SMA elements 30 may be particularly beneficial in a camera apparatus 1. This is both due to the usually limited power supply (in particular when used in handheld devices), and because there may be extended periods of time for which the movable part 20 is to be held in position relative to the support structure 10. In AF applications, for example, the position of the lens is to be maintained once a desired focus position has been reached. In other camera applications, it may generally be desirable to avoid the movable part 20 moving freely when the SMA wires 30 are not powered to reduce the risk of damage to sensitive components (such as lenses or other optical components) carried by the movable part 20.

In general, such benefits may be achieved in apparatus other than a camera apparatus. The provision of superelastic SMA wires may thus be particularly useful for any actuator assembly with an optical component (such as a lens, prism, mirror, diffraction grating, light source, etc) or imaging component (such as an image sensor, light sensor, etc).

According to embodiments of the present invention, there is thus provided an actuator assembly 2 comprising a support structure 10 and a movable part 20 that is movable relative to the support structure 10, an arrangement of superelastic SMA elements 30 arranged, on actuation, to move the movable part 20 relative to the support structure 10, wherein the hysteretic properties of the superelastic SMA elements 30 are configured to hold the movable part 10 in position when the SMA actuator elements are not actuated, and an optical component or imaging component fixed relative to the support structure 10 and/or movable part 20.

In general, the present invention extends to actuator assemblies not comprising any optical or imaging components.

Elongate Instrument

Figure 4:
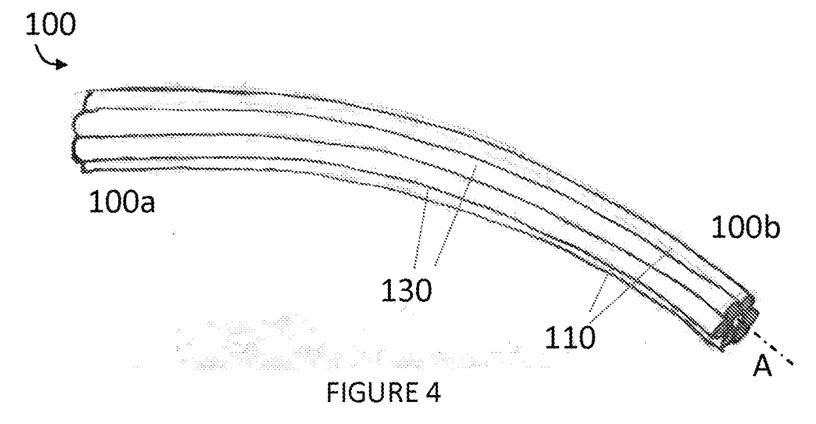
FIG. 4 is a schematic perspective view of an elongate instrument according to an embodiment of the present invention.

The present invention may further be embodied by an elongate instrument 100. FIG. 4 schematically depicts such an elongate instrument 100 according to embodiments of the present invention. The elongate instrument 100 comprises a proximal end 100*a* and a distal end 100*b*. The distal end 100*b* may be movable relative to the proximal end 100*a*, in particular bend relative to the proximal end 100*a*. The distal end 100*b* may thus be considered to correspond to a movable part 20, and the proximal end 100*a* may be considered to correspond to a support structure 10 in accordance with terminology used with reference to FIGS. 1 to 3. The elongate instrument 100 extends between the proximal end 100*a* and the distal end 100*b*. FIGS. 6A-6E depict cross-sections perpendicular to the axis A of embodiments of the elongate instrument 100.

The elongate instrument 100 comprises a plurality of elongate superelastic SMA elements 110, in particular superelastic SMA wires 110. The superelastic SMA elements 110 are arranged around an axis A. The superelastic SMA elements 110 extend between the proximal end 100*a* and the distal end 100*b*.

The superelastic SMA elements 110 are arranged, on selective energization (i.e. heating), to bend the distal end 100*b* relative to the proximal end 100*a*. SMA material has the property that on heating it undergoes a solid-state phase change which causes the SMA material to contract. At lower temperatures the SMA material enters the Martensite phase. At higher temperatures the SMA enters the Austenite phase which induces a deformation causing the SMA material to contract. The phase change occurs over a range of temperature due to the statistical spread of transition temperature in the SMA crystal structure. Thus, heating of the superelastic SMA elements 110 may cause them to decrease in length. Selective energization of the superelastic SMA elements 110 may thus lead to selective contraction of the superelastic SMA elements 110, which may be used to bend the distal end of the elongate instrument 100.

The superelastic SMA elements may each be electrically connected to a control circuit (not shown) which may be implemented in an integrated circuit (IC) chip, for example. The control circuit in use applies drive signals to the superelastic SMA elements which resistively heat the superelastic SMA elements, causing them to be energized and to contract. The plural superelastic SMA elements may be driven independently or otherwise. The control circuit may also measure the resistance of the superelastic SMA elements, and use the measured resistance to calculate/determine the position of the distal end 100*b*. In general, however, the superelastic SMA elements may be heated so as to contract by any other suitable means, such as via an external heat source, radiative heating or inductive heating.

The superelastic SMA elements exhibit hysteretic properties that constrain the distal end from returning to an unbent position when the plurality of superelastic SMA elements are not energized.

The superelastic SMA elements 110 may be in tension. The superelastic SMA elements may be stretched to a strain that places them halfway across the pseudo-elastic region or more than halfway across the pseudo-elastic region depicted in FIG. 5.

Alternatively, the superelastic SMA elements 110 may be in compression. The superelastic SMA elements may be compressed to a strain that places them halfway across the pseudo-elastic region or more than halfway across the pseudo-elastic region.

Arrangement of Superelastic SMA Elements in Elongate Instrument

Figure 6A:
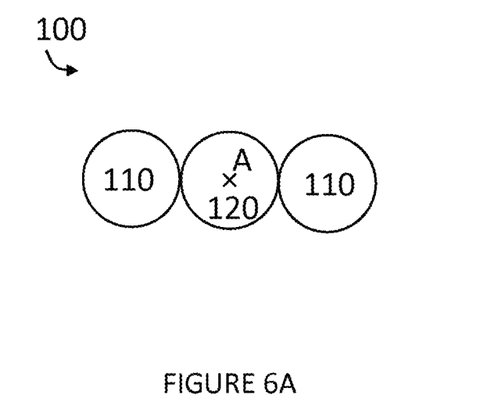
FIGS. 6A-F are cross-sectional views of embodiments of the elongate instrument.

The plurality of superelastic SMA elements may comprises two superelastic SMA elements 110. This is schematically depicted in FIG. 6A, for example. The two superelastic SMA elements 110 are configured, on selective energization, to bend the distal end 110*b* in opposite directions. The two superelastic SMA elements 110 may be in tension and strained in an unbent starting position, i.e. in a position in which the elongate instrument is straight and extends along a straight axis between the proximal and distal ends 100*a*, 100*b*. Energization (so heating) of one of the superelastic SMA elements 110 will lead to contraction of that superelastic SMA element 110. With reference to FIG. 6A, for example, contraction of the right superelastic SMA element 110 will bend the distal end 100*b* of the elongate instrument 100 towards the right. Contraction of the left superelastic SMA element 110 will bend the distal end 100b of the elongate instrument 100 towards the left. Selective energization and so selective contraction of the superelastic SMA elements 110 may thus be used to bend the distal end 110b in opposite directions and in one DOF.

Upon ceasing energization of the superelastic SMA elements 110, the hysteretic properties of the superelastic SMA elements 110 will prevent the distal end from returning to its unbend position. The elongate instrument 100 will thus not automatically straighten when energy supply to the superelastic SMA elements ceases. This allows the distal end to maintain its bent position without requiring power supply to the superelastic SMA elements, reducing the overall power consumption of the elongate instrument.

Figure 6B:
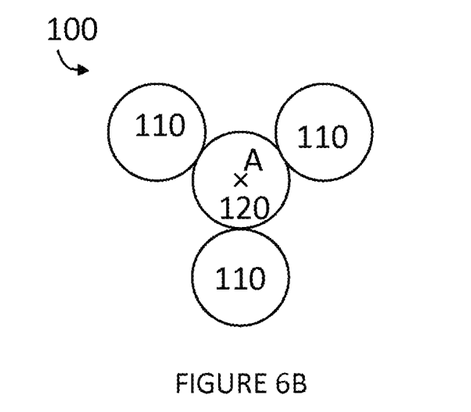

FIG. 6B depicts an alternative embodiment in which the plurality of superelastic SMA elements comprises three superelastic SMA elements 110. The superelastic SMA elements are configured, on selective energization, to bend the distal end in any direction. Energizing any one of the superelastic SMA elements 110, for example, will bend the distal end in the angular direction in which the one superelastic SMA element 110 is arranged relative to the axis A. So, energizing the bottom superelastic SMA element 110 in FIG. 6B will bend the distal end of the elongate instrument 100 towards the bottom. Energizing two superelastic SMA elements 110 will bend the distal end in an angular direction between the angular directions in which the two superelastic SMA elements 110 are arranged. In this manner, the distal end of the elongate instrument 100 may be bent in any direction. The distal end 100b (i.e. the movable part) may move in two DOFs relative to the proximal end 100a (i.e. the support structure).

Figure 6C:
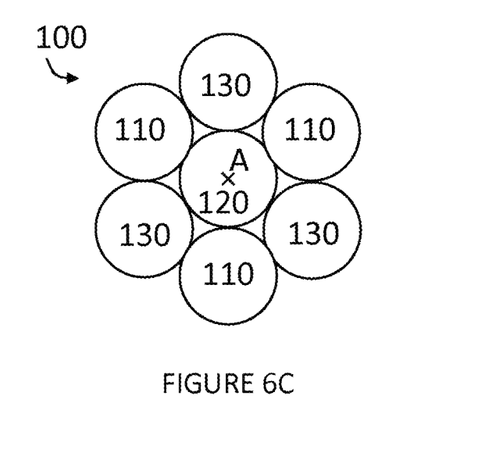
Figure 6D:
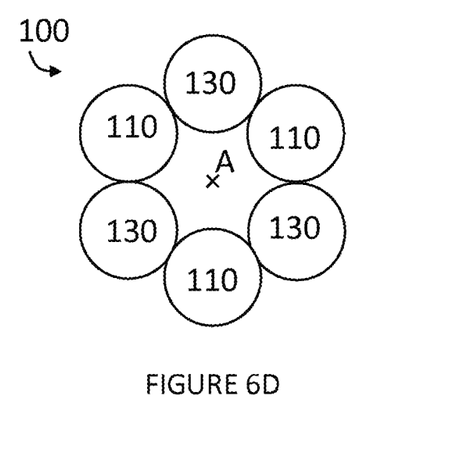
Figure 6E:
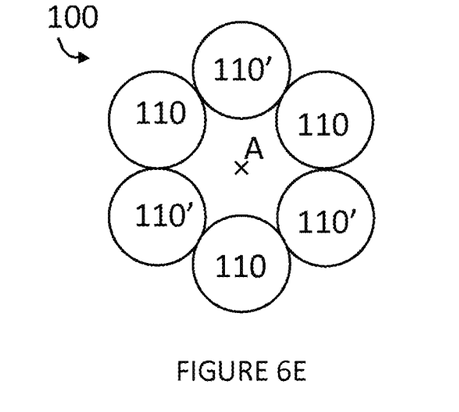
Figure 6F:
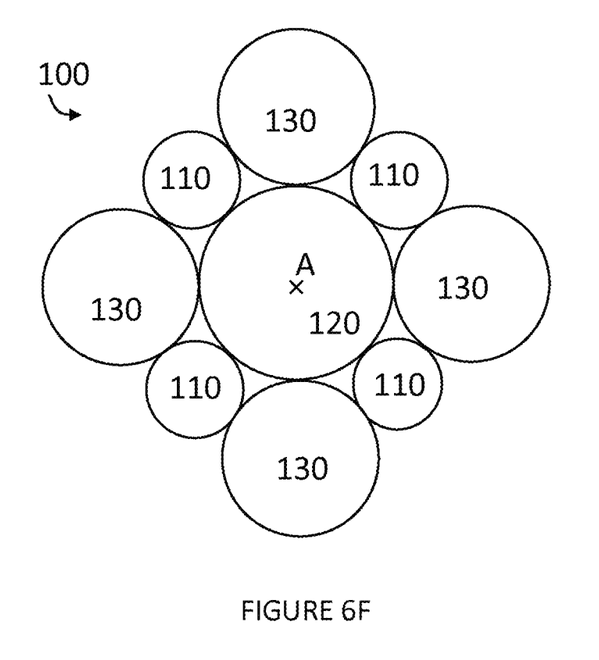

FIG. 6F depicts another alternative embodiment in which the plurality of superelastic SMA elements comprises four superelastic SMA elements 110. The superelastic SMA elements are configured, on selective energization, to bend the distal end in any direction. The four superelastic SMA elements 110 are arranged in two pairs of superelastic SMA elements 110. Within each pair, the superelastic SMA elements 110 are configured, on selective energization, to bend the distal end 110b in opposite directions. The two pairs of superelastic SMA elements 110 bend the distal end 110b in directions that are perpendicular to one another. So, the superelastic SMA elements 110 of a first pair may bend the distal end in opposite first directions, and the superelastic SMA elements 110 of a second pair may bend the distal end in opposite second directions, where the first and second directions are perpendicular to one another. Using four superelastic SMA elements 110 may thus effectively decouple bending in perpendicular directions, which may make control of the position of the distal end 100b simpler (at the cost of an extra superelastic SMA elements 110) compared to using three superelastic SMA elements 110.

Flexible Core

As shown in FIGS. 6A, 6B, 6C and 6F, the elongate instrument 100 may further comprise a flexible core 120. The flexible core 120 is not necessarily required. The superelastic SMA elements 110 surround the flexible core 120. The superelastic SMA elements 110 may be evenly distributed around the flexible core 120.

The flexible core 120 may carry the tensile or compressive force in the superelastic SMA elements 110. The superelastic SMA elements 110 may be arranged to be in tension and strained in an unbent position of the distal end 100b. The flexible core 120 may be in compression and resisting buckling of the elongate instrument 100. Alternatively, the superelastic SMA elements 110 may be arranged to be in compression and strained in an unbent position of the distal end 100b. The flexible core 120 may be in tension. So, in the unbent position the flexible core 120 may be in compression and the plurality of superelastic SMA elements 110 in tension, or wherein the flexible core 120 may be in tension and the plurality of superelastic SMA elements 110 in compression.

The plurality of superelastic SMA elements 110 are coupled to the flexible core 120. The plurality of superelastic SMA elements 110 may be glued or otherwise affixed to the flexible core 120. Alternatively, a sleeve may surround the plurality of superelastic SMA elements 110 so as to keep the superelastic SMA elements coupled to the flexible core 120. The plurality of superelastic SMA elements 110 may be coupled to the flexible core 120 along the entire extent of the superelastic SMA elements 110, or may at least be coupled at separated points. The superelastic SMA elements 110 may be coupled at least at the distal end to the flexible core 120.

Optionally, the flexible core comprises one or more electrical conductors connected at the distal end 100b to the plurality of superelastic SMA elements 110. The flexible core may be made from an electrically conductive material. The electrical conductors may be used to selectively energize the plurality of superelastic SMA elements 110. For example, the electrical conductor may be used to provide a common ground connected to the SMA elements 110 at the distal end 100b, and In some embodiments, the flexible core 120 comprises superelastic SMA. Superelastic SMA may be particularly suitable to carry the relatively large tensile or compressive forces that may arise in the plurality of superelastic SMA elements 110.

Insulator Elements

As shown in FIGS. 6C and 6D, the elongate instrument 100 may further comprise insulator elements 130. The insulator elements 130 coextend with the plurality of superelastic SMA elements 110. The insulator elements 130 are provided between adjacent superelastic SMA elements 110. The insulator elements 130 may serve to electrically and/or thermally insulate the superelastic SMA elements 110 from one another. Electrical shorting between the superelastic SMA elements 110 may thus be avoided.

Providing the insulator elements 110 may be provided as spacers between adjacent superelastic SMA elements 110, making assembly of the superelastic SMA elements 110 easier. Direct contact between the superelastic SMA elements 110 may thus be reliably avoided.

In some embodiments, the superelastic SMA elements 110 may be coated with an insulating coating, thus further reducing the risk of direct contact between adjacent superelastic SMA elements 110.

Compressive and Tensile Superelastic SMA Elements

As explained above, the superelastic SMA elements 110 may be arranged to be in tension or in compression, and are strained in an unbent position of the distal end. In the embodiments of FIGS. 3A-D, the tensile or compressive force in the superelastic SMA elements 110 is carried by the flexible core 120 and/or the insulator elements 130.

In another embodiment, schematically depicted in FIG. 6E, the plurality of superelastic SMA elements 110 comprises a first set 110 of superelastic SMA elements that are arranged to be in tension and strained in an unbent position of the distal end and a second set 110' of superelastic SMA elements that are arranged to be in compression and strained in an unbent position of the distal end. The superelastic SMA elements of the first set 110 thus carry the forces in the superelastic SMA elements of the second set 110', and vice versa.

As shown in FIG. 6E, the superelastic SMA elements of the second set 110' may be arranged diametrically opposite the axis to the superelastic SMA elements of the first set 110. Bending of the distal end 100b of the elongate instrument 100 may be effected by energizing diametrically opposite superelastic SMA elements 110. With reference to FIG. 6E, for example, energizing the bottom SMA element 110 (which is in tension) and concurrently energizing the top SMA element 110' (which is in compression) will result in the bottom SMA element 110 contracting and the top SMA element 110' extending. The distal end 100b thus bends downward.

Using superelastic SMA elements both in compression and in tension may allow the tensile/compressive forces in the superelastic SMA elements to be balanced more easily. Furthermore, bending of the distal end is achieved by both extending and concurrently contracting selected superelastic SMA elements, improving movement control of the distal end 100b.

In preferred embodiments, there are at least three superelastic SMA elements in the first set of superelastic SMA elements. The three superelastic SMA elements 110 are arranged as already described in relation to FIG. 6B. This allows the distal end to be bent in any direction.

Relative Diameters of Elements

Although FIGS. 6A-E depict the superelastic elements 110, the flexible core 120 and the insulator elements 130 as having substantially equal diameters, in general the diameters of these elements may differ, in some cases significantly.

For example, the diameter of the flexible core 120 may be larger than the diameter of the superelastic elements 110. This may be particularly beneficial to allow the flexible core to carry the relatively large tensile or compressive forces in the superelastic SMA elements 110. For example, the diameter of the flexible core 120 may be at least twice, or at least three times, or at least five times the diameter of the superelastic SMA elements 110.

The diameter of the insulator elements 130 may be similar to the diameter of the superelastic SMA elements 110. Alternatively, the diameter of the insulator elements 130 may be greater than the diameter of the superelastic SMA elements 110. For example, the diameter of the insulator elements 130 may be at least twice, or at least three times, or at least five times the diameter of the superelastic SMA elements 110.

The elongate instrument may be a guide element, e.g. a guide wire. Such a guide element can be inserted into a patient and is then used to guide the insertion of larger tools such as surgical tools, endoscopes, probes etc into patients. The elongate instrument may thus have a maximum extend, perpendicular to the axis A, that is less than 2 mm, preferably less than 1 mm. The elongate instrument may have a maximum extend, perpendicular to the axis A, in the range from 0.3 to 0.9 mm, for example.

Assembly of Elongate Instrument

As described above, the superelastic SMA elements 110 may be stretched or compressed to a strain that is approximately halfway across the pseudo-elastic region or more than halfway across the pseudo-elastic region.

This may be achieved during assembly of the elongate instrument, for example, by tensioning and stretching the (first set of) superelastic SMA elements 110 with an external force prior to coupling the superelastic SMA elements 110 to the flexible core 120, insulator elements 130 and/or second set of superelastic SMA elements 110'. The superelastic SMA elements 110 (of the first set) may be stretched more than halfway across the pseudo-elastic region. After coupling, the external tensile force may be removed to allow the superelastic SMA elements 110 (of the first set) to contract until the tensile force in the superelastic SMA elements 110 is balanced by the compressive force in the flexible core 120, insulator elements 130 and/or second set of superelastic SMA elements 110'.

Alternatively, during assembly of the elongate instrument the flexible core 120 and/or insulator elements 130 may be tensioned and stretched with an external force prior to coupling to the superelastic SMA elements 110. After coupling, the external tensile force may be removed to allow the flexible core 120 and/or insulator elements 130 to contract until the tensile force in the flexible core 120 and/or insulator elements 130 is balanced by the compressive force in the superelastic SMA elements 110.

SMA Element

The above-described SMA actuator assemblies comprise at least one SMA element. The term 'shape memory alloy (SMA) element' may refer to any element comprising SMA. The SMA element may be described as an SMA wire. The SMA element may have any shape that is suitable for the purposes described herein. The SMA element may be elongate and may have a round cross section or any other shape cross section. The cross section may vary along the length of the SMA element. The SMA element might have a relatively complex shape such as a helical spring. It is also possible that the length of the SMA element (however defined) may be similar to one or more of its other dimensions. The SMA element may be sheet-like, and such a sheet may be planar or non-planar. The SMA element may be pliant or, in other words, flexible. In some examples, when connected in a straight line between two components, the SMA element can apply only a tensile force which urges the two components together. In other examples, the SMA element may be bent around a component and can apply a force to the component as the SMA element tends to straighten under tension. The SMA element may be beam-like or rigid and may be able to apply different (e.g. non-tensile) forces to elements. The SMA element may or may not include material(s) and/or component(s) that are not SMA. For example, the SMA element may comprise a core of SMA and a coating of non-SMA material. Unless the context requires otherwise, the term 'SMA element' may refer to any configuration of SMA material acting as a single actuating element which, for example, can be individually controlled to produce a force on an element. For example, the SMA element may comprise two or more portions of SMA material that are arranged mechanically in parallel and/or in series. In some arrangements, the SMA element may be part of a larger SMA element. Such a larger SMA element might comprise two or more parts that are individually controllable, thereby forming two or more SMA elements. The SMA element may comprise an SMA wire, SMA foil, SMA film or any other configuration of SMA material. The SMA element may be manufactured using any suitable method, for example by a method involving drawing, rolling, deposition and/or other forming process(es). The SMA element may exhibit any shape memory effect, e.g. a thermal shape memory effect or a magnetic shape memory effect, and may be controlled in any suitable way, e.g. by Joule heating, another heating technique or by applying a magnetic field.

The invention claimed is:

1. An actuator assembly comprising:
   a support structure;
   a movable part that is movable relative to the support structure; and
   an arrangement of superelastic shape memory alloy (SMA) elements arranged, on actuation, to move the movable part relative to the support structure, wherein the hysteretic properties of the superelastic SMA elements are configured to hold the movable part in position when the superelastic SMA elements are not actuated;
   wherein the superelastic SMA elements have a phase transition temperature of less than 70° C.

2. The actuator assembly according to claim 1, wherein the movable part is movable relative to the support structure along three orthogonal axes.

3. The actuator assembly according to claim 1, wherein the movable part is rotatable relative to the support structure about at least two orthogonal axes.

4. The actuator assembly according to claim 1, wherein the movable part is suspended from the support structure by the superelastic SMA elements.

5. The actuator assembly according to claim 1, wherein the arrangement of superelastic SMA elements comprises eight superelastic SMA elements inclined with respect to a notional primary axis with two superelastic SMA elements on each of four sides around the primary axis, the superelastic SMA elements being connected between the movable part and the support structure so that on contraction two groups of four superelastic SMA elements provide a force on the movable part with a component in opposite directions along the primary axis, the superelastic SMA elements of each group being arranged with 2-fold rotational symmetry about the primary axis.

6. The actuator assembly according to claim 1, wherein the movable part is movable along two orthogonal axes in a plane relative to the support structure.

7. The actuator assembly according to claim 6, wherein the arrangement of superelastic SMA elements comprises four superelastic SMA elements capable of being selectively driven to move the movable part relative to the support structure to any position within a range of movement in a movement plane without applying any net torque to the movable part in the movement plane.

8. The actuator assembly according to claim 1, further comprising a lens assembly and/or image sensor coupled to the movable part and/or the support structure.

9. An actuator assembly comprising:
   a support structure;
   a movable part that is movable relative to the support structure; and
   an arrangement of superelastic shape memory alloy (SMA) elements arranged, on actuation, to move the movable part in relative to the support structure, wherein the hysteretic properties of the superelastic SMA elements are configured to hold the movable part in position when the superelastic SMA elements are not actuated,
   wherein the superelastic SMA elements suspend the movable part on the support structure; and
   wherein the superelastic SMA elements have a phase transition temperature of less than 70° C.

10. An elongate instrument comprising:
    a proximal end and a distal end; and
    a plurality of superelastic shape memory alloy (SMA) elements arranged around an axis between the proximal end and the distal end,
    wherein the superelastic SMA elements are arranged, on selective energization, to bend the distal end relative to the proximal end, and
    wherein the hysteretic properties of the superelastic SMA elements constrain the distal end from returning to an unbent position when the plurality of superelastic SMA elements are not energized; and
    wherein the superelastic SMA elements have a phase transition temperature of less than 70° C.

11. The elongate instrument according to claim 10, wherein the plurality of superelastic SMA elements are arranged to be in tension or in compression, and are strained in an unbent position of the distal end, and wherein at the unbent position of the distal end the plurality of superelastic SMA elements are strained equally.

12. The elongate instrument according to claim 10, wherein the plurality of superelastic SMA elements comprises two superelastic SMA elements, and wherein the two superelastic SMA elements are configured, on selective energization, to bend the distal end in opposite directions.

13. The elongate instrument according to claim 10, wherein the plurality of superelastic SMA elements comprises three or more superelastic SMA elements, and wherein the superelastic SMA elements are configured, on selective energization, to bend the elongate instrument in any direction.

14. The elongate instrument according to claim 10, further comprising a flexible core extending along the axis, wherein the plurality of superelastic SMA elements are coupled to the flexible core.

15. The elongate instrument according to claim 14, wherein in the unbent position the flexible core is in compression and the plurality of superelastic SMA elements are in tension, or wherein the flexible core is in tension and the plurality of superelastic SMA elements are in compression.

16. The elongate instrument according to claim 10, further comprising insulator elements that coextend with the plurality of superelastic SMA elements and are provided between adjacent superelastic SMA elements.

17. The elongate instrument according to claim 10, wherein the plurality of superelastic SMA elements comprises a first set of superelastic SMA elements that are arranged to be in tension and strained in an unbent position of the distal end and a second set of superelastic SMA elements that are arranged to be in compression and strained in an unbent position of the distal end.

18. An actuator assembly according to claim 1, wherein the movable part is movable relative to the support structure in at least two degrees of freedom.

* * * * *